(12) United States Patent
Galecka et al.

(10) Patent No.: US 8,348,338 B2
(45) Date of Patent: Jan. 8, 2013

(54) ELECTRICAL CONNECTION PROTECTION UNIT

(75) Inventors: Mark E. Galecka, Novi, MI (US); Joseph Michael Kish, Canton, MI (US); Eric B. Michalak, Northville, MI (US); Jeffrey C. Vincent, South Lyon, MI (US)

(73) Assignee: Johnson Controls Technology Company, Holland, MI (US)

( * ) Notice: Subject to any disclaimer, the term of this patent is extended or adjusted under 35 U.S.C. 154(b) by 164 days.

(21) Appl. No.: 12/676,246

(22) PCT Filed: Sep. 9, 2008

(86) PCT No.: PCT/US2008/075693
§ 371 (c)(1),
(2), (4) Date: Jan. 31, 2011

(87) PCT Pub. No.: WO2009/035966
PCT Pub. Date: Mar. 19, 2009

(65) Prior Publication Data
US 2011/0272980 A1   Nov. 10, 2011

Related U.S. Application Data

(60) Provisional application No. 60/971,040, filed on Sep. 10, 2007, provisional application No. 61/060,648, filed on Jun. 11, 2008.

(51) Int. Cl.
*B60N 2/48* (2006.01)
(52) U.S. Cl. .................. 297/216.12; 297/391; 297/408; 297/410
(58) Field of Classification Search ............... 29/216.12, 29/391, 396–410
See application file for complete search history.

(56) References Cited

U.S. PATENT DOCUMENTS

| | | | |
|---|---|---|---|
| 6,217,118 B1 * | 4/2001 | Heilig | 297/410 |
| 6,445,408 B1 | 9/2002 | Watkins | |
| 6,447,068 B1 | 9/2002 | Anderson et al. | |
| 6,575,494 B1 | 6/2003 | Heilig et al. | |
| 6,733,079 B2 | 5/2004 | Gans et al. | |
| 6,811,221 B2 | 11/2004 | Demianenko et al. | |
| 7,070,240 B2 | 7/2006 | Schmitt et al. | |
| 7,121,626 B2 | 10/2006 | Akehi et al. | |
| 7,134,717 B2 | 11/2006 | Thunnissen et al. | |
| 7,770,967 B2 * | 8/2010 | Hirota et al. | 297/216.12 |
| 7,866,754 B2 * | 1/2011 | Furukawa et al. | 297/391 |
| 8,042,428 B2 * | 10/2011 | Shimizu et al. | 297/216.12 X |
| 8,047,606 B2 * | 11/2011 | Matsui | 297/216.12 |
| 8,109,570 B2 * | 2/2012 | Nishiura et al. | 297/410 X |
| 8,118,360 B2 * | 2/2012 | Oota et al. | 297/216.12 |
| 8,167,376 B2 * | 5/2012 | Song | 297/410 |
| 2006/0055214 A1 | 3/2006 | Serber | |
| 2006/0097561 A1 | 5/2006 | Sato et al. | |
| 2006/0192367 A1 | 8/2006 | Zumpano | |
| 2006/0220434 A1 * | 10/2006 | Schulz et al. | 297/410 |
| 2008/0048479 A1 * | 2/2008 | Yoshida et al. | 297/410 |
| 2008/0054701 A1 * | 3/2008 | Yoshida et al. | 297/410 |
| 2010/0109397 A1 * | 5/2010 | Bandurksi et al. | 297/216.12 |

\* cited by examiner

*Primary Examiner* — Rodney B White
(74) *Attorney, Agent, or Firm* — Dickinson Wright PLLC

(57) ABSTRACT

A vehicle seat having a seat with an upper seatback and a headrest including various electronic components. A connector sleeve is configured to fit within a guide sleeve on the seat to allow an electrical connector extending from the headrest to be easily and efficiently connected to an opposing electrical connector extending from the seat during assembly. The connector may be configured to maintain electrical connection between the connected electrical connectors when a removal force is applied.

30 Claims, 10 Drawing Sheets

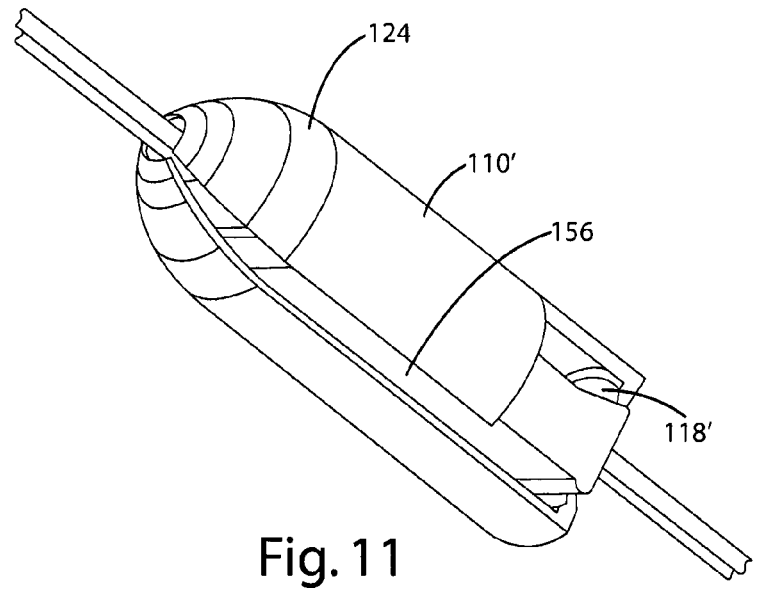
Fig. 11
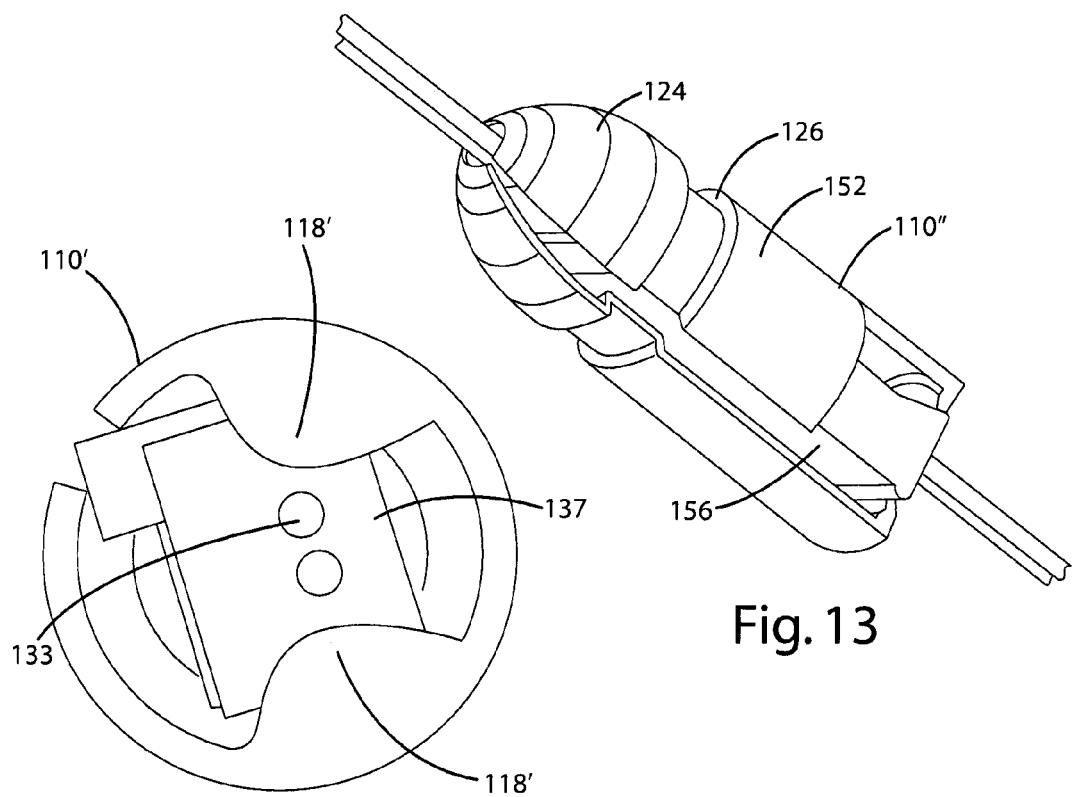
Fig. 12
Fig. 13

ELECTRICAL CONNECTION PROTECTION UNIT

CROSS REFERENCE TO RELATED APPLICATIONS

This application claims priority to U.S. Provisional Patent Application Ser. No. 60/971,040 filed Sep. 10, 2007, entitled "Vehicle Seat," as well as U.S. Provisional Patent Application Ser. No. 61/060,648 filed Jun. 11, 2008, entitled "Electrical Connection Protection Unit," and PCT International Patent Application PCT/US08/75693 filed Sep. 9, 2008 entitled "Electrical Connection Protection Unit," all applications being incorporated herein by reference.

BACKGROUND OF THE INVENTION

1. Technical Field

The present invention is directed to a vehicle seat having a seat with an upper seatback and a headrest including various electronic components. A connector sleeve is configured to fit within a guide sleeve to allow an electrical connector extending from the headrest to be easily and efficiently connected to an opposing electrical connector extending from the seat during assembly. The connector may be configured to maintain electrical connection between the connected electrical connectors when a removal force is applied to prevent separation of the connectors.

2. Discussion

Modern headrests may include electrical components for safety related features as well as other convenience features. An example of a safety related feature is an electronic device that moves the headrest with the occupant's head during collision to protect against whiplash. Another example of a potential safety feature that requires electrical components in a headrest is airbags. An example of a convenience feature is power adjustment capabilities of the headrest, such as power tilt.

Headrests are generally shipped separately for later assembly at a remote location to the main portion of the seat, which includes the seatback. During final assembly of the seat, the wires extending from the headrest must be connected to wires extending from the seat. Traditionally, once assembled these wires between the headrest and the seatback are visible to the occupant of the vehicle, especially when the headrest is extended upward. Due to the variance in height of many vehicle occupants, the headrests are commonly raised from the seat back and the exposed wires not only visibly detract from the aesthetic characteristics of the seat but may be susceptible to damage in the extended upward position. Therefore, there is a need for a wire connection assembly that allows the headrest to be shipped separately from the main portion of the seat and later attached at a remote location in an easy and efficient manner, while concealing the wire assembly from the occupant of the vehicle and protecting it from damage.

At times, the headrests need to be repaired or replaced. For example, if the airbag in a headrest detonates, an electronic feature malfunctions, or the headrest is cosmetically damaged, the headrest may need to be removed, the electrical connectors separated, and the new connectors from the new headrest electrically coupled to the wiring assembly and connectors extending through the seatback. Problems may occur as illustrated in FIG. 8 when the electrical connector engages items within the seat, which may prevent removal. Even more problematic is if the lower electrical connector engages an item and becomes separated from the upper connector. Typically this results in having to open the seat, in particular the seatback, to retrieve the connector, which is extremely time consuming, and may even damage the seat, in particular the seat covering. Therefore, there is a need for a connector that minimizes the potential to catch objects within the seat back and also stays engaged even when substantial removal force is applied.

SUMMARY OF THE INVENTION

The present invention is directed to a vehicle seat having a seat with an upper seatback and a headrest including various electronic components. A connector sleeve is configured to fit within a guide sleeve to allow an electrical connector extending from the headrest to be easily and efficiently connected to an opposing electrical connector extending from the seat during assembly. The connector may be configured to maintain electrical connection between the connected electrical connectors when a removal force is applied to prevent separation of the connectors.

The connector sleeve has a longitudinal axis and is configured to receive electrical connectors. The connector sleeve includes an outer surface including a first tapered portion and a circumferential channel, and a passage extending along the longitudinal axis, the passage being defined by an inner wall and wherein the inner wall includes a first reduced diameter portion.

The reduced diameter portion may form a ledge extending outwardly and approximately perpendicularly toward the longitudinal axis. A second reduced diameter portion having a smaller diameter than at the first reduced diameter portion may be included.

The invention may be further directed to a wiring harness assembly having a first wiring harness including at least one wire terminating in a first electrical connector and a second wiring harness including at least one wire terminating in a second electrical connector. A connector sleeve having a longitudinal axis and an outer surface defining a tapered portion is coupled to the second wiring harness. The connector sleeve defines a passageway including a ledge to support the wire end of the second electrical connector.

The present invention is also directed to a wiring harness assembly for electrically connecting a vehicle seat with a headrest and wherein the seat includes a guide sleeve having a retention mechanism including a catch and wherein the guide sleeve is configured to receive a guide rod on the headrest. The wiring harness assembly includes a first wiring harness extending from the headrest including at least one wire terminating in a first electrical connector. The first electrical connector is configured to be electrically coupled to a second electrical connector on a second wiring harness extending from the seat. A connector sleeve having a longitudinal axis is coupled to the second wiring harness and includes a recess for receiving the catch from the retention mechanism. The connector sleeve is partially disposed within the guide sleeve when the catch is disposed within the recess. The connector sleeve includes a ledge directly engaging the second connector and wherein the ledge supports the second electrical connector against movement along the longitudinal axis as the first electrical connector is coupled to the second electrical connector.

The present invention is further directed to a connector sleeve having a longitudinal axis, an outer surface including a tapered end, and an inner wall defining a cavity for receiving an electrical connector. A first leg extends toward the longitudinal axis and configured to retain the electrical connector within the cavity. An access slot is defined by the outer surface and generally extends from the tapered end to the leg.

A wiring harness assembly for a vehicle seat, including at least one wire terminating in a first electrical connector and a connector sleeve having a longitudinal axis coupled to the wiring harness. The connector sleeve includes an outer surface extending from a first end to a second end and wherein the outer surface includes a tapered portion near one of the ends and support legs near the other of the ends.

The present invention is assembled by providing a seat having a seatback including a guide sleeve for receiving a guide rod of a headrest; providing a wiring assembly; threading the wiring assembly through the guide sleeve; and coupling the wiring assembly to the guide sleeve.

BRIEF DESCRIPTION OF THE DRAWINGS

FIG. 11 is a top front perspective view of an exemplary connector sleeve;

FIG. 12 is a bottom view of the connector sleeve holding the coupled wiring connectors;

FIG. 13 is a top front perspective view of a second exemplary connector sleeve.

DETAILED DESCRIPTION OF THE PREFERRED EMBODIMENT

Figure 1:
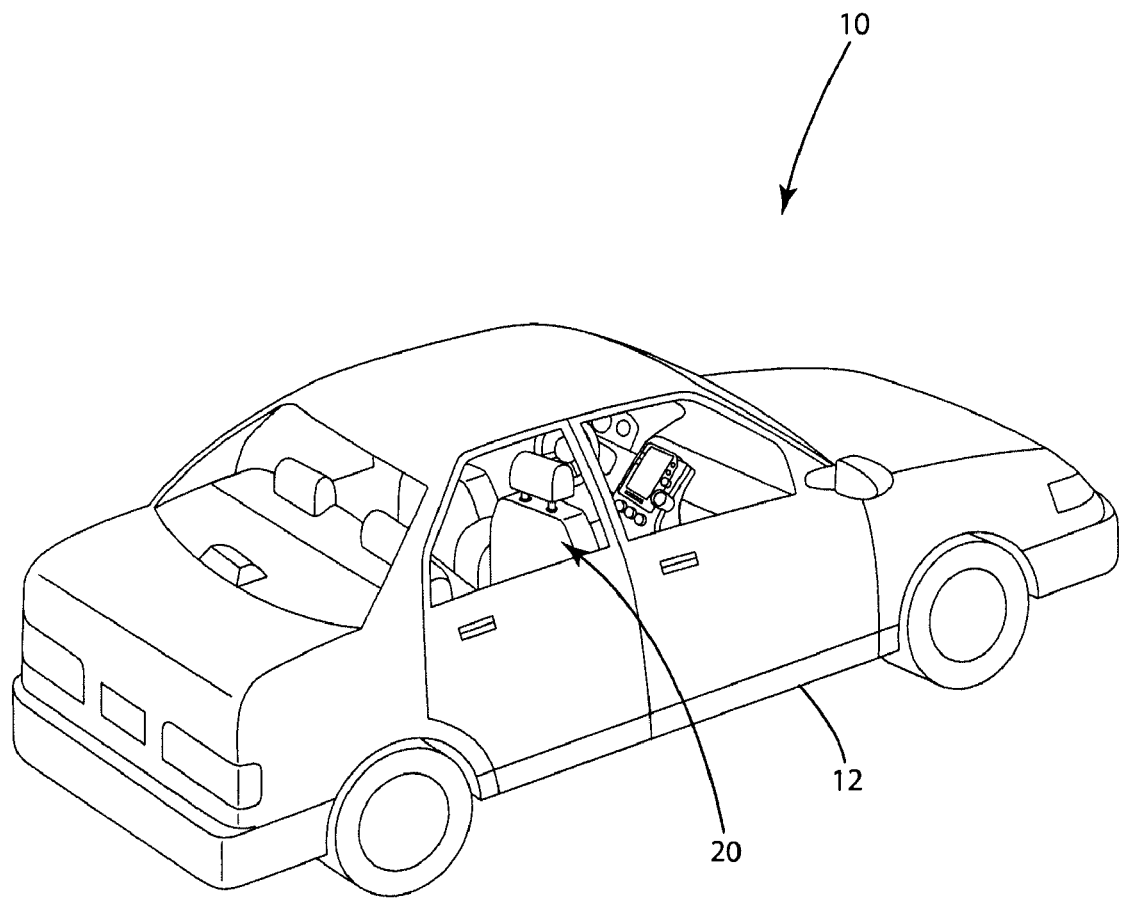
FIG. 1 is a perspective view of an exemplary vehicle.

A vehicle 10 is illustrated as having a support assembly 12 such as a frame or body to which a vehicle seat 20 is assembled as illustrated in FIG. 1. The seat 10 generally includes a headrest 80 having guide rods 90 coupled to guide sleeves 50 in a seatback 30. The present invention may be used on any seat 20 having a headrest and in particular on any seat 20 having a headrest 80 including electronic components. For simplicity and ease of illustration, the present invention and headrest 80 will only be illustrated as being coupled to a front seat 20 of the vehicle 10. Of course, one skilled in the art would easily recognize that the present invention may also be used in other vehicle seats having headrests with electronic components, for example, in mid-row or rear vehicle seating. To power and electrically communicate with the electronic components in the headrest, a vehicle wiring harness (not illustrated) extends through the vehicle 10, through the seat 20 and to the headrest 80. The vehicle wiring harness is coupled to a wiring assembly within the seat, specifically a first wiring harness 132 extending from the headrest 80 and electrically coupled to a second wiring harness 136 extending from the seat 20.

Figure 2:
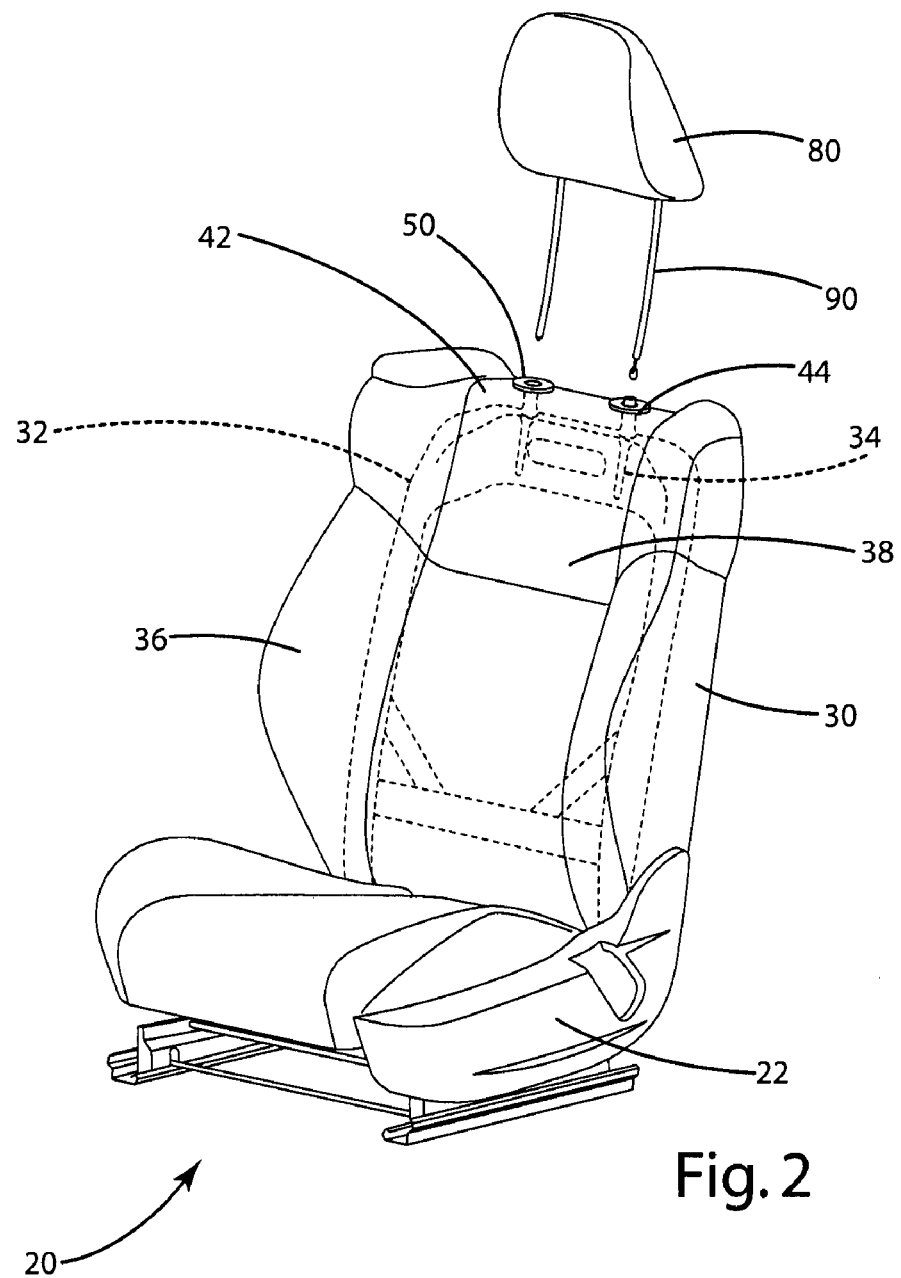
FIG. 2 is a perspective view of an exemplary seat and headrest.

As illustrated in FIG. 2, the vehicle seat 20 includes a lower portion 22 and a seatback 30 for supporting the occupant of the seat 20. The seat 20, including the seat lower portion 22 and seatback 30, may be formed in any desired size, shape or style. The seat 20 will be illustrated in an exemplary configuration in the figures; however, any other style, shape or size may be used whether for functional, stylistic or other reasons. The seatback 30 further includes a frame 32, providing support for a surrounding cushion portion 36. The frame 32 may be also formed in any desired size, shape or style, so long as it provides sufficient support to the occupant of the seat 20. The seat 20 is covered by any desired seating surface material such as fabric, leather, or other surface materials usable for seats 20.

The seatback frame 32 generally includes a cross member 34 near an upper portion 42 of the seatback 30. The seatback 30 is assembled with a cushion 36 being attached to the frame 32. A cavity 38 is typically created or defined by the seat cushion 36 and frame 32. The upper portion 42 of the seatback 30 includes a recess 44 and in some embodiments, as illustrated in the figures, at least two recesses 44 which extend into the seatback and typically through the cross member 34 and into the cavity 38. The guide sleeves 50 are typically inserted into the recesses 44.

During the assembly of the seatback 30, a guide sleeve 50 is typically assembled to the seatback 30 as illustrated in FIGS. 2-5 and 7. The guide sleeve 50 is configured to receive and retain the headrest 80. The guide sleeve 50 may be formed in any shape, style or configuration and is generally well known in the art. The exemplary guide sleeves 50 generally include a passageway 52 and are typically coupled to the cross member 34 of the frame 32 in the seatback 30. The guide sleeves 50 are configured to receive and retain within the passageway 52, the guide rods 90 of a headrest 80.

The guide sleeves 50 typically include a retention mechanism 60 which is generally well known in the art. The retention mechanism 60 can be any retention mechanism that retains the guide rods 90 of the headrest 80 at a desired height which allows the headrest 80 to be adjusted for different people. The retention mechanism 60 typically includes a catch 62 and spring 64, if it is a mechanical release system. Many retention mechanisms are configured to have a spring 64 push a catch 62 into an indent on the guide rod 90 to retain the headrest 80 in the specified position.

The headrest 80 may include electrical components (not illustrated) to perform various functions and tasks. Electrical components in headrests have become more common as manufacturers have added various safety and convenience features. For example, in some headrests, during a collision, the headrest moves forward with the occupant's head to prevent whiplash injuries. The headrest 80 typically includes a frame or support mechanism (not illustrated) coupled to the guide rods 90 and a cushion portion which is covered in a material 84 similar to the material used to cover other portions of the seat 20.

Figure 3:
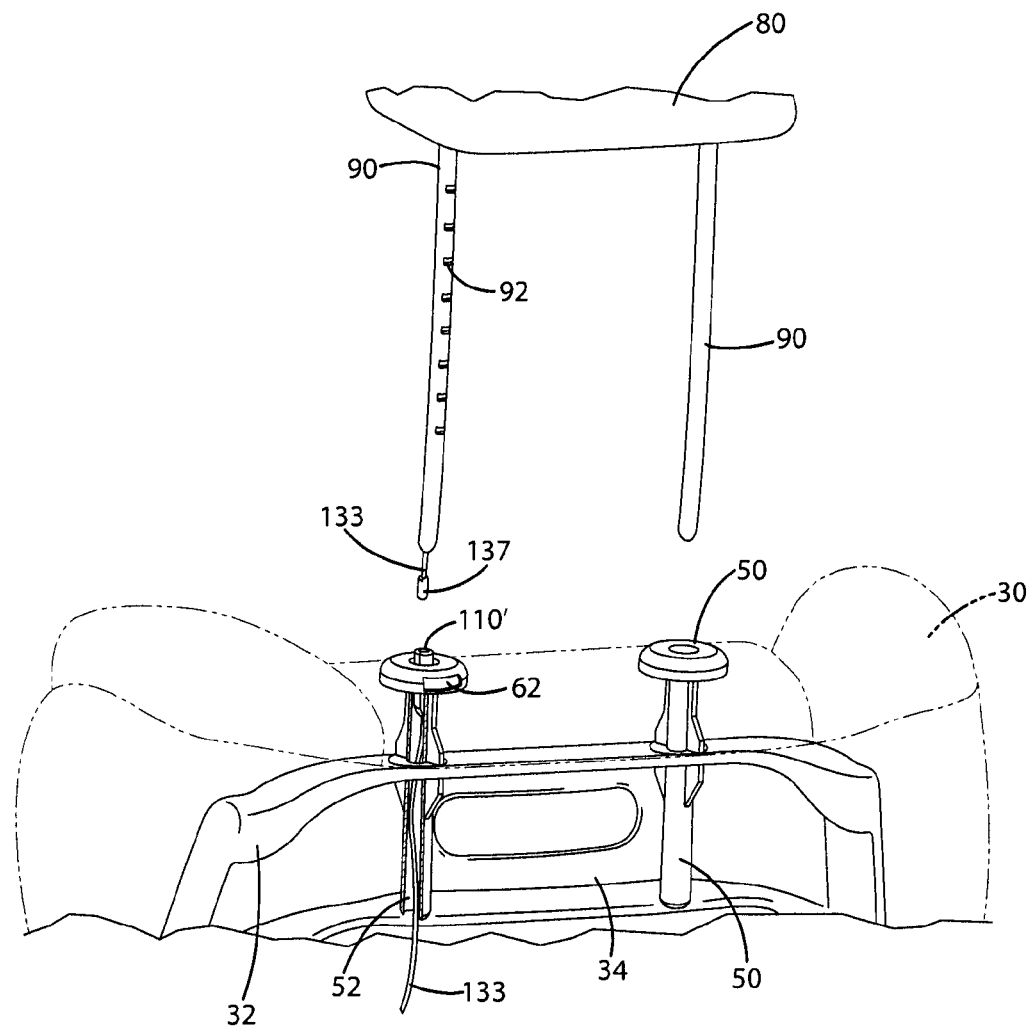
FIG. 3 is an enlarged rear partial sectional perspective view of the upper seatback in phantom showing the seat frame, guide sleeves and wiring assemblies.
Figure 4:
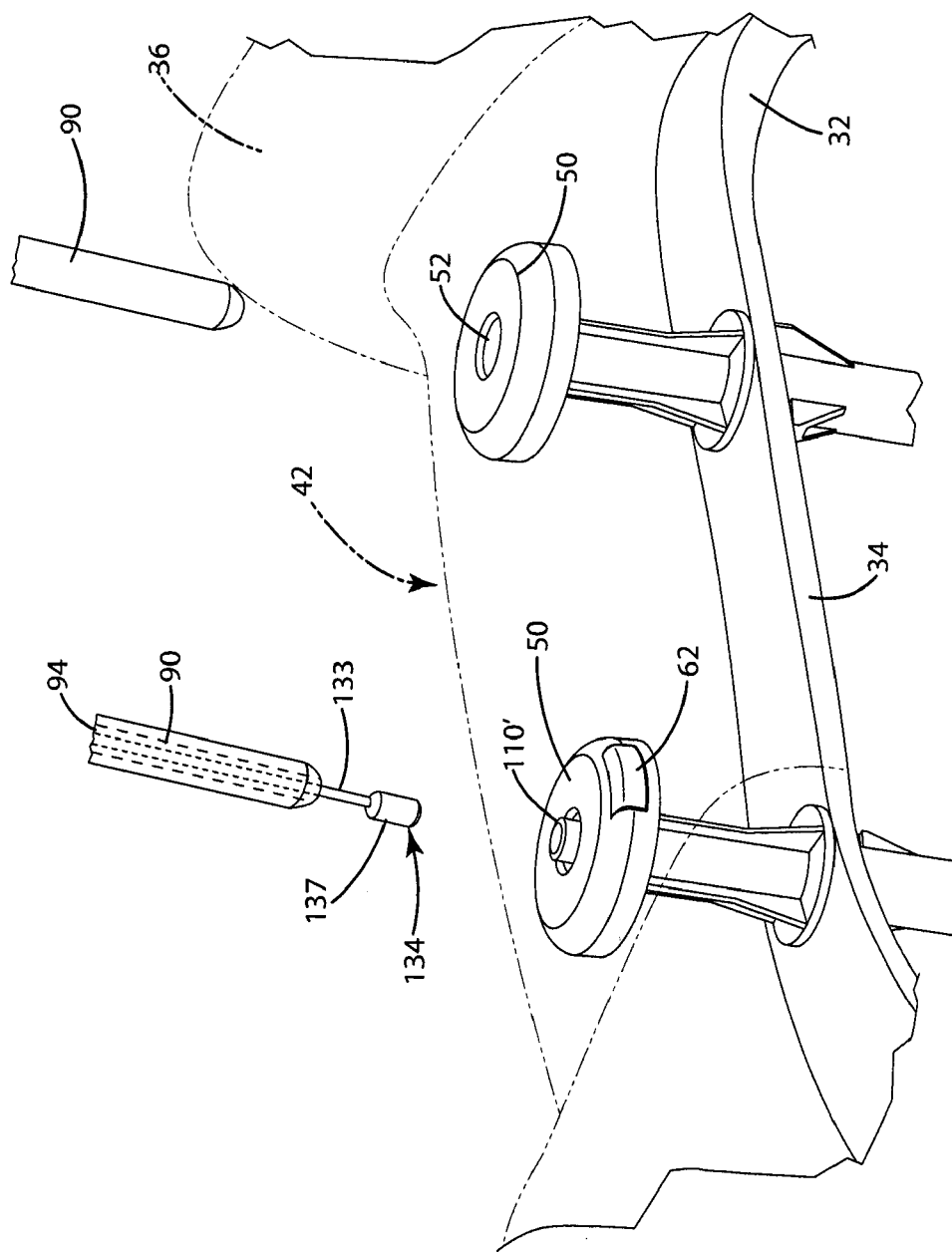
FIG. 4 is an enlarged perspective partial sectional view of the seat frame, guide sleeves and electrical connectors.
Figure 5:
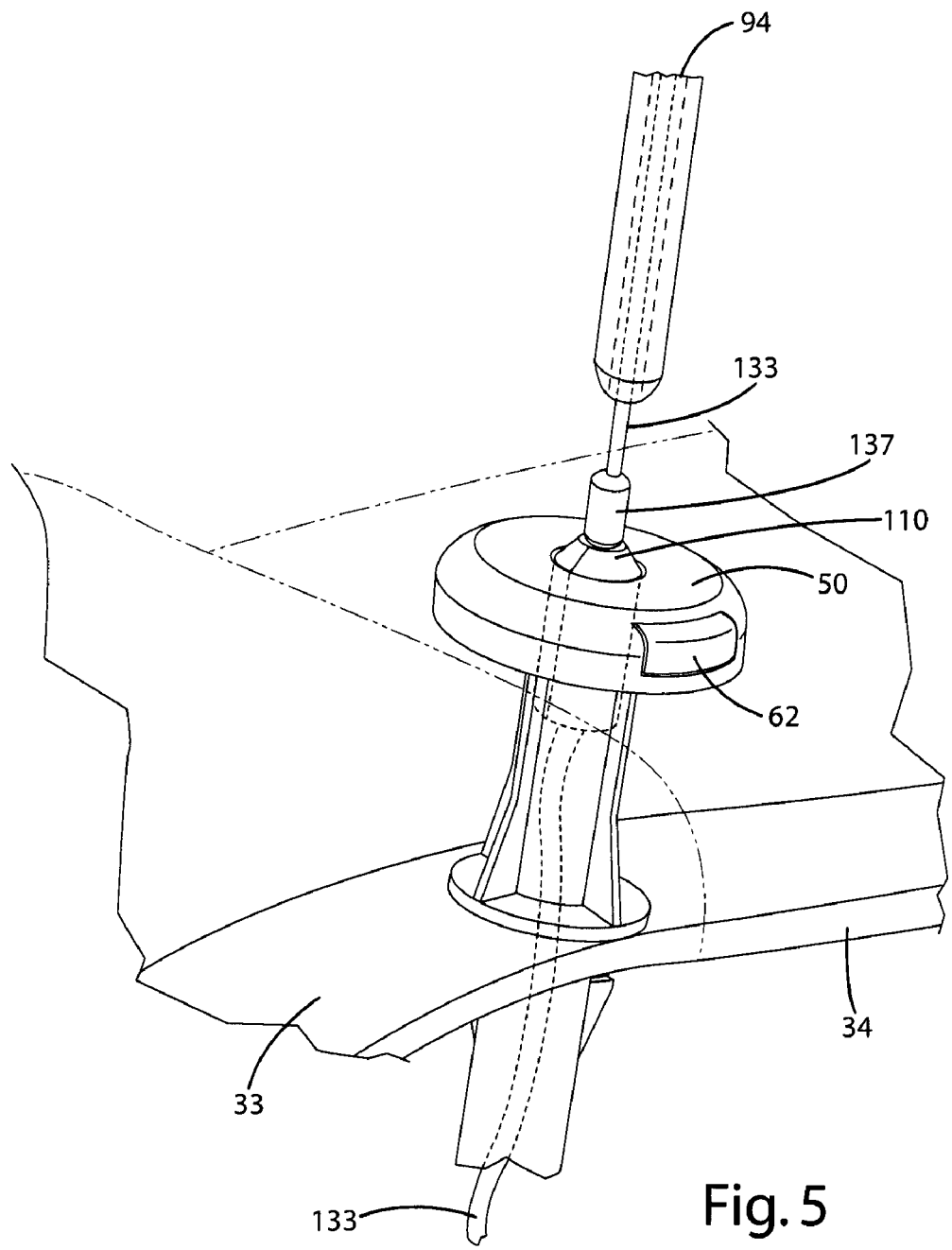
FIG. 5 is an enlarged perspective view of the electrical connectors coupled and the connector sleeve coupled to the guide sleeve.

The guide rods 90 extend from the headrest 80 and include indents 81 that mate with the retention mechanism 60 to allow the height of the headrest 80 from the seatback 30 to be adjusted. While most guide rods 90 are made out of a solid material, the present invention uses at least one guide rod 90 that is hollow and includes an elongated passage 94. Of course, one guide rod 90 may include the passageway 94 while the other guide rod 90 is solid. The guide rods 90, although not illustrated, include an exit within the headrest 80 from the elongated passage 92. This exit within the headrest 80 may be configured to ensure that the guide rod 90 does not rub or cut into the first wiring harness and allows for easy assembly during assembly of the headrest, of a first wiring harness 132 to the electrical components in the headrest. Each of the first and second wiring harnesses 132, 136 generally include wires 133 and are electrically connected through wiring connectors 134. It is expected that the first wiring harness 132 will be installed by passing the wires 133 through the elongated passage 94 on the guide rods 90 and attaching the wires 133 to the electronic components in the headrest 80. After assembly, as illustrated in FIGS. 3-5, the first wiring harness wires 133 extend from the guide rod 90 and terminate in one of the wiring connectors 134. The headrest 80, assembled as described above, may be assembled remotely from the seat 20 and shipped separately from the seat 20 for later assembly into the final seat 20.

The wiring connectors 134 may be any type of electrical connector which allows easy assembly to another wiring connector. Although any type of wiring connectors may be used, it is expected that a typical male/female pair of wiring connectors 134 will be used, such as the illustrated exemplary connectors 137, 139. Although any style of connectors may be used, it is also expected that the wiring connectors will include a channel (not illustrated) and a throughbore (not illustrated) extending longitudinally therewith, and within the throughbore electrical terminals (not illustrated) to provide electrical connections.

Vehicle seats 20 are commonly manufactured with various electronic components and the seat 20 typically includes a variety of wiring components. The wiring harness 130 and specifically, the second wiring harness 136 run through the seat 20 and connects with the main electrical system on the vehicle 10. Electrical components commonly included in seats include devices for carrying out the various power functions of the seat 20, side airbags, and heating or cooling devices. During the manufacturing process of the seat 20, the second wiring harness 136 is extended through the seat 20 and specifically through the seatback 30. In the present invention and the second wiring harness 136 extends up and through the guide sleeves 50 to terminate in a portion of the wiring connectors 134, such as the illustrated second wiring connector 137. This allows the electronic components in the headrest 80 to be connected through the first and second wiring harnesses 132 and 136 and more specifically the first and second wiring connectors 137 and 139 to other electronic components such as the vehicle computer.

To maintain the second wiring harness 136 in a position readily and easily accessible during assembly and, particularly the second wiring connector 139, the second wiring connector 139 is coupled to a connector sleeve 110 or may be specially configured to incorporate the connector sleeve 110. The connector sleeve 110, as illustrated in FIGS. 3-7, is configured to be received and retained within the guide sleeve 50 and more particularly retained by the retention mechanism 60.

The assembly of the seatback 30 and in particular the addition of the assembly of the second wiring harness 136 may occur through a variety of methods. For example, the second wiring harness 136 may be passed through the guide sleeve 50, through the cavity 38 defined by the seatback 30, and attached to another wiring harness (not illustrated) within the seat 20 or extend from the lower portion of the seat 20 for later connection to a wiring on the vehicle. In another embodiment, the second wiring harness 136 may be, such as where the second wiring harness 136 is an integral extension or subcomponent of another wiring harness within the seat, passed through in a reversed process, such as the assembler threading the second wiring harness 136 with attached second wiring connector 139 up through the cavity 38 of the seat, through the cross member 34, and through the guide sleeve 50. In both exemplary methods, the assembler would during the assembly process attach the connector sleeve 110 to the second wiring harness 136 and in particular to the second wiring connector 139 or the connector sleeve 110 would already be attached during the assembly process of wiring harness 130, specifically the second wiring harness 136. The connector sleeve 110 could be snapped onto the second wiring harness or otherwise attached, however in some embodiments, the connector sleeve 110 may be integrally formed with the second wiring connector 139 on the second wiring harness 136. A variety of other methods may be used to retain or couple the second wiring connector 139 to the connector sleeve 110 such as an insert and lock mechanism where the second wiring connector is inserted into the connector sleeve and then twisted to couple it to the connector sleeve. To complete assembly of the seat, before the headrest is attached to the seatback, the connector sleeve 110 is pushed into the guide sleeve 50 and retained by the retention mechanism 60. This ensures that the connector 137 does not become displaced into the seat 20 during shipment and assembly.

The connector sleeve 110 is configured with a passage 112 defined by inner walls 114. The passage 112 and inner walls 114 may take on any size, shape, or configuration that allows for easy and reliable retention of the second wiring harness 136, specifically the second connector 137, within the connector sleeve 110. More specifically, the connector sleeve 110 must retain the second wiring harness 136 within the passage 112 while an assembler exerts a force to connect the first wiring connector 134 to the second wiring connector 139. During assembly, as the assembler is pushing down against the second wiring connector 139 on the second wiring harness 136, the connection sleeve 110 must not be displaced within the guide sleeve 50 or more specifically allow the second wiring connector 139 to become displaced from the connecting sleeve 110. Any displacement into the seatback 30 prematurely would cause a problem during the assembly process. For example, if the second wiring harness 136 becomes displaced into the seatback, the assembly process is delayed while the wiring harness is retrieved or a replacement seat is acquired and substituted. Retrieving the wiring harness 136 is a difficult and time consuming. In some instances, the seat 20 and in particular, the seatback 30 may require disassembly before the wiring harness 136 may be retrieved.

Figure 6:
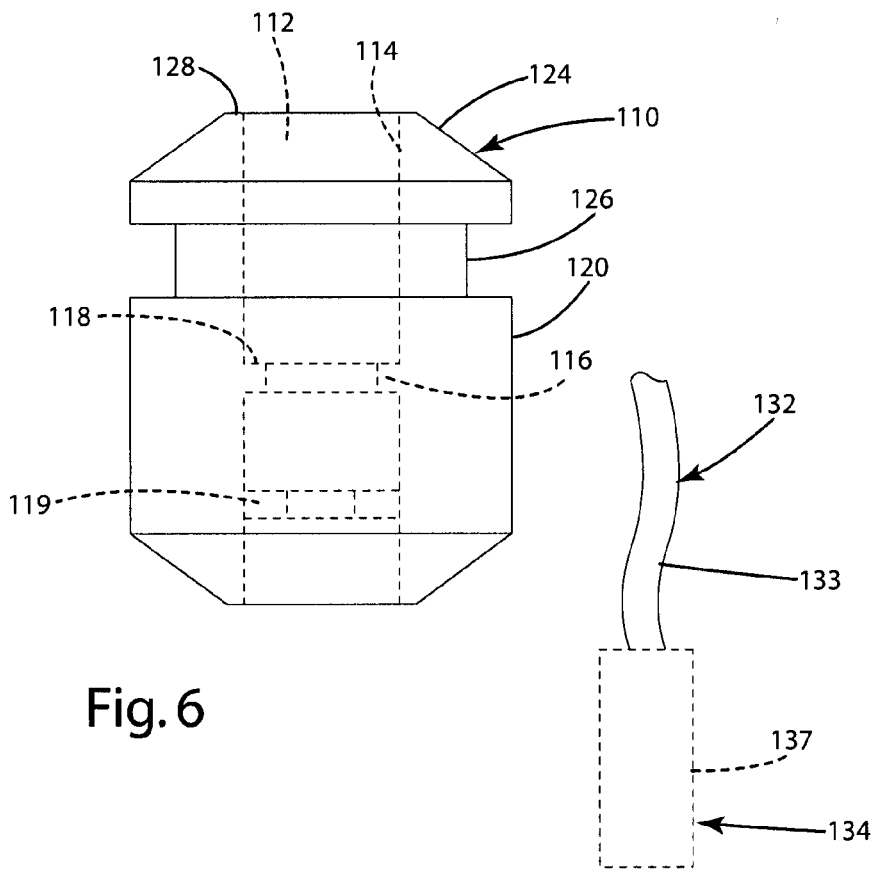
FIG. 6 is a side view of the connector sleeve showing the internal passages.
Figure 7:
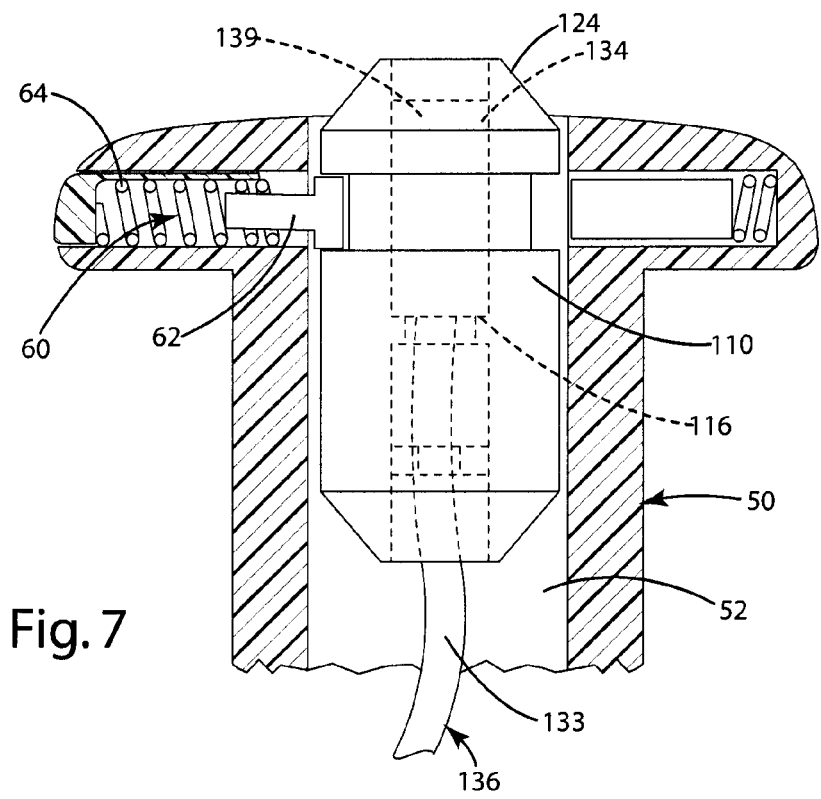
FIG. 7 is a sectional view of the guide sleeve retaining the connector and a first wiring assembly.

A variety of configurations may be used to sufficiently retain the second wiring harness 136, in particular the second wiring connector 139, and FIGS. 6 and 7 show an exemplary configuration for the inner walls 114 of the connector sleeve 110. As illustrated in FIGS. 6 and 7, the inner walls 114 define a reduced diameter portion 116 which creates a ledge or stop 118 against which the second wiring connector 139 may rest. Therefore, even if the connector sleeve 110 is not formed integrally around the second wiring connector 139 but is instead a snapped configuration or even two parts held temporarily together by the guide sleeve 50, the connector sleeve 110 while being retained within the passageway 52 on the guide sleeve 50 will securely retain the second wiring connector 139 and therefore the second wiring harness 136 in a position ready for assembly. More specifically, the ledge 118 provides support for the second wiring connector 139 to allow force to be applied to the second wiring connector 139 while yet staying retained within the connector sleeve 110. The wires 133 may pass through the reduced diameter portion 116 and into the seat 20, specifically the seatback 30.

As further illustrated in FIGS. 6 and 7, a wire lock or wire retention device 119 may be included in the connector sleeve 110. This wire retention device 119 is generally configured to hold the wires with a compressive force such as slightly crimping the wires within the connector sleeve 110. Holding the wires in place with the wire retainer device 119 reduces the stress on the wiring connectors, such as stress where the wires are coupled to terminals in the second wiring connector 139. More particularly, the wire retention device 119 minimizes stress on the connection between the wires 133 and electrical contacts in the second connector 139 during shipping of the seat 20, and in some circumstances, during the assembly of the seatback 30.

The connector sleeve 110 also includes outer walls 120 that define tapered portions 124 and a recess 126. The tapered portions 124 are designed to allow easy insertion of the connector sleeve 110 into the guide sleeves 50, and more specifically the connector sleeve 110 to easily displace the retention mechanism 60 during insertion into the guide sleeve 50. In the preferred embodiment, the tapered portions 124 are included on each end of the connector sleeve 110. This allows easy assembly as well as easy removal for repair or replacement of the headrest 80. The tapered portions 124 minimize sharp edges and planar surfaces and thereby minimize the potential for the wiring harness to get caught on objects within the seat during assembly and during repair or replacement. While the connector sleeve 110 is illustrated in FIGS. 6 and 7 as having tapered portions 124 on each end, the connector sleeve 110 may be formed with only a tapered end on one side, to allow easy insertion during the assembly of the upper seatback 30. Therefore, if the connector is assembled up through the guide sleeves 50 from the inner portion of the seat, the top end of the connector 110 would be formed tapered as it is needed to displace the retention mechanism 60 and more particularly the catch 62 while the other end may not include a taper. Of course, this would also ease removal after assembly as the tapered portion 124 would be facing the direction of travel for the wiring harness 130 to be removed such that the first and second connectors may be disconnected to allow repair or replacement of the headrest 80. However, if the wire assembly is passed through from the top side of the guide sleeves 50, the connector sleeve may be formed with a tapered portion 124 on the lower end of the connector sleeve 110 to allow the connector sleeve to be pushed from the upper side of the guide sleeve 50 into the guide sleeve while the opposing end may have a different shape.

The recess 126 on the connector sleeve 110 is configured to engage the retention mechanism 60 and retain the connector sleeve 110 within the guide sleeve 50 while the first wiring connector 137 on the first wiring harness 132 is connected to the second wiring connector 137 on the second wiring harness 136 are assembled. The recess 126 may be formed in a variety of sizes, shapes, and configurations and is designed to mate with the retention mechanism 60. Therefore, the type of recess 126 on the connector sleeve 110 depends on the type of retention mechanism 60 used for a particular seat. Of course, the connector sleeve 110 may be formed with a recess 126 that allows for use with a variety of retention mechanisms. While the recess 126 is illustrated as being near the upper tapered portion 124, the location of the recess may vary as desired along the longitudinal extent of the outer walls 113 of the connector sleeve 110.

During the assembly of the vehicle 10, the vehicle seat 20 and headrest 80 are typically manufactured separately. During the manufacture of the vehicle seat 20, including the upper seatback 30, wiring harnesses are added to the seat 20. These wiring harnesses are threaded to various locations within the seat, and in the present invention a second wiring harness 136 including a connector sleeve 110 is assembled to the seat 20. The connector sleeve 110 may be integral with the second wiring harness 136 or may be formed separately and then assembled to the wiring harness before or after it is thread to its destination. More specifically, during assembly of the seatback 30, the second wiring harness 136 is thread through the guide sleeve 50. The coupled connector sleeve 110 is inserted into the guide sleeve 50 and retained by the retention mechanism 60 engaging the recess 126. The tapered portions 124 allow the assembler to couple the connector sleeve 110 to the guide sleeves 50 by displacing the retention mechanical 60 with minimal force as the connection sleeve 110 is inserted into the guide sleeve 50.

The headrest 80, assembled separately, includes the wires passing through the guide rods 90 to the first wiring connector 134 on the first wiring harness 132. Many times the seats 20 are shipped separately to the final assembly location from the headrest 80 and after the seat 20 is assembled in the vehicle or just before the seat is assembled in the vehicle, the headrest 80 is attached to the seat 20. During attachment, the assembler inserts the first wiring connector 137 on the first wiring harness 132 into a mating second wiring connector 139 held by the connector sleeve 110. The connector sleeve 110 prevents the second wiring harness 136 from falling into the seat during the assembly process and allows for easy assembly as the assembler may push the first wiring harness 132 and, in particular, the first wiring connector 137 against the opposing second wiring connector 139 on the second wiring harness 136 with some force. Once the wiring connectors 134 are attached as illustrated in FIG. 5, the assembler may release the retention mechanism 60 so that the catch 62 is disengaged from the recess 126 on the connector sleeve 10, thereby allowing the connector sleeve 110 to pass through passage 52 on the guide sleeves 50 as the guide rods 90 are inserted into the guide sleeves 50. In some instances, the assembler may need to feed the wires 133 into the guide sleeve 50 before inserting the guide rods 90.

It is expected that the first wiring harness 132 on the headrest 80 will have minimal wires showing beyond the end of the guide rod 90 to ensure that as the guide rod 90 is inserted into the guide sleeve 50, the ends of the guide rod 90 will not damage either wiring harness 132 and 136. The connector sleeve 110 is also configured to easily pass through the passageway on the guide sleeve 50. It is expected that the connector sleeve would have an outer diameter that is smaller than the inner diameter of the passageway 52 yet not too small such that it could become tilted within the passageway 52 and stick within the passageway 52 on the guide sleeve 50. The connector sleeve 110 may also include a flat portion 111 for engaging the guide rods 90 if force needs to be applied to the connector sleeve 110 to displace it from the guide sleeve 50.

Figure 8:
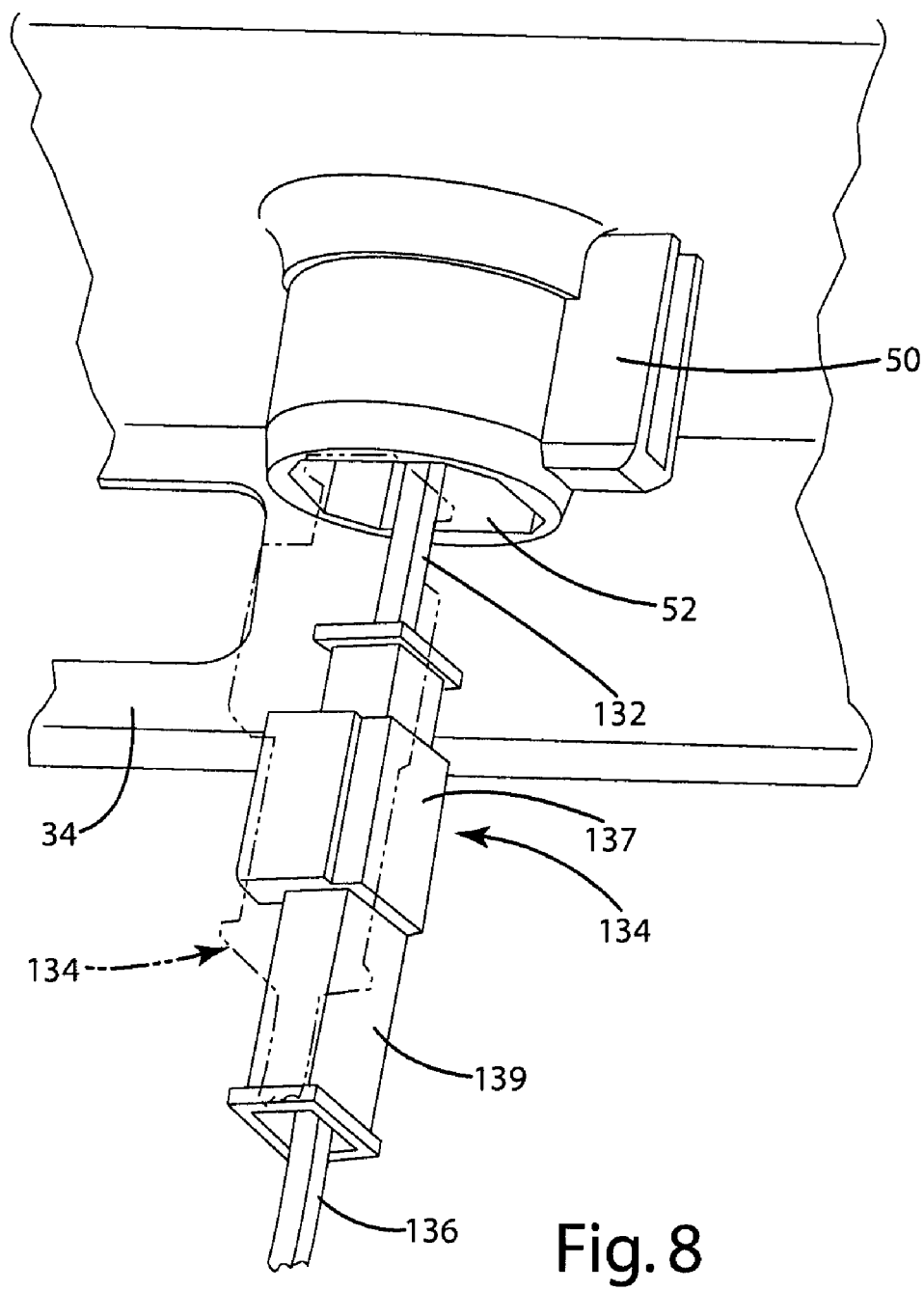
FIG. 8 is a perspective view of a connector within a seat and an exemplary problem when the wiring connector is removed from the seat.
Figure 9:
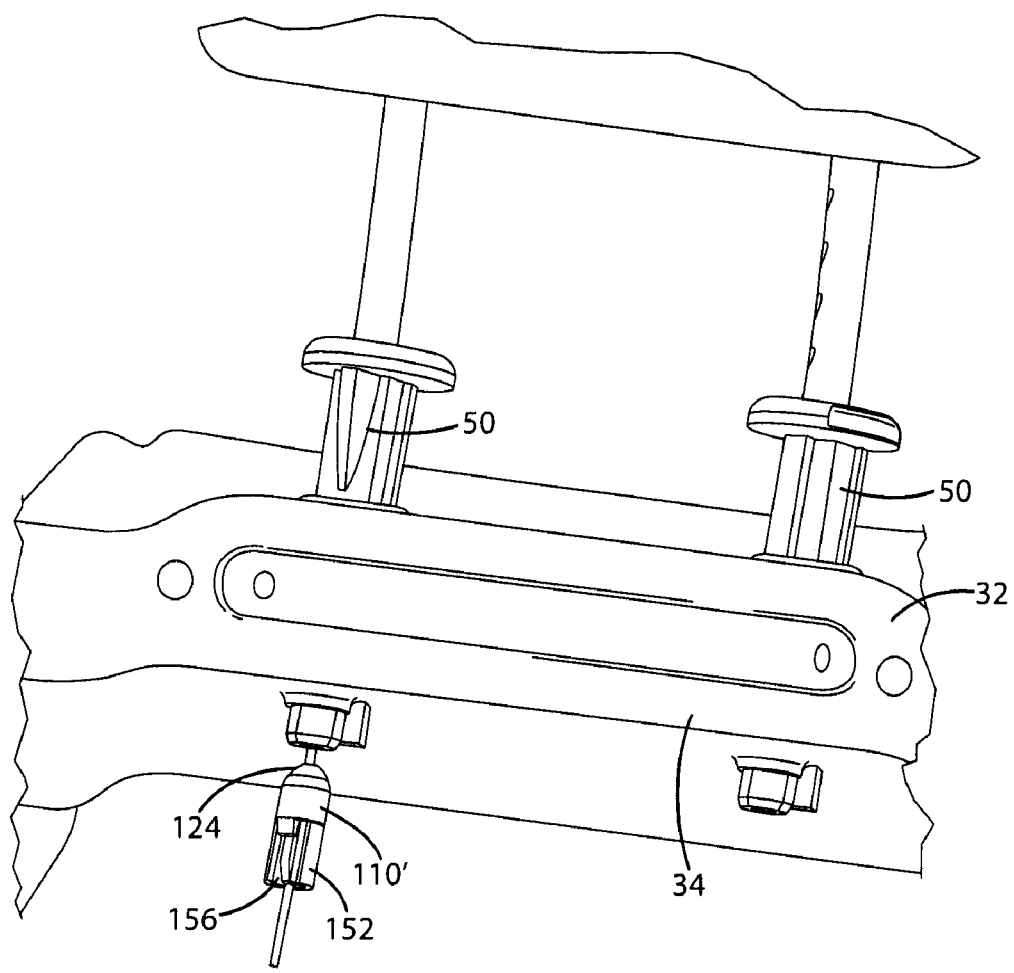
FIG. 9 is a perspective view of an exemplary connector within the seatback.
Figure 10:
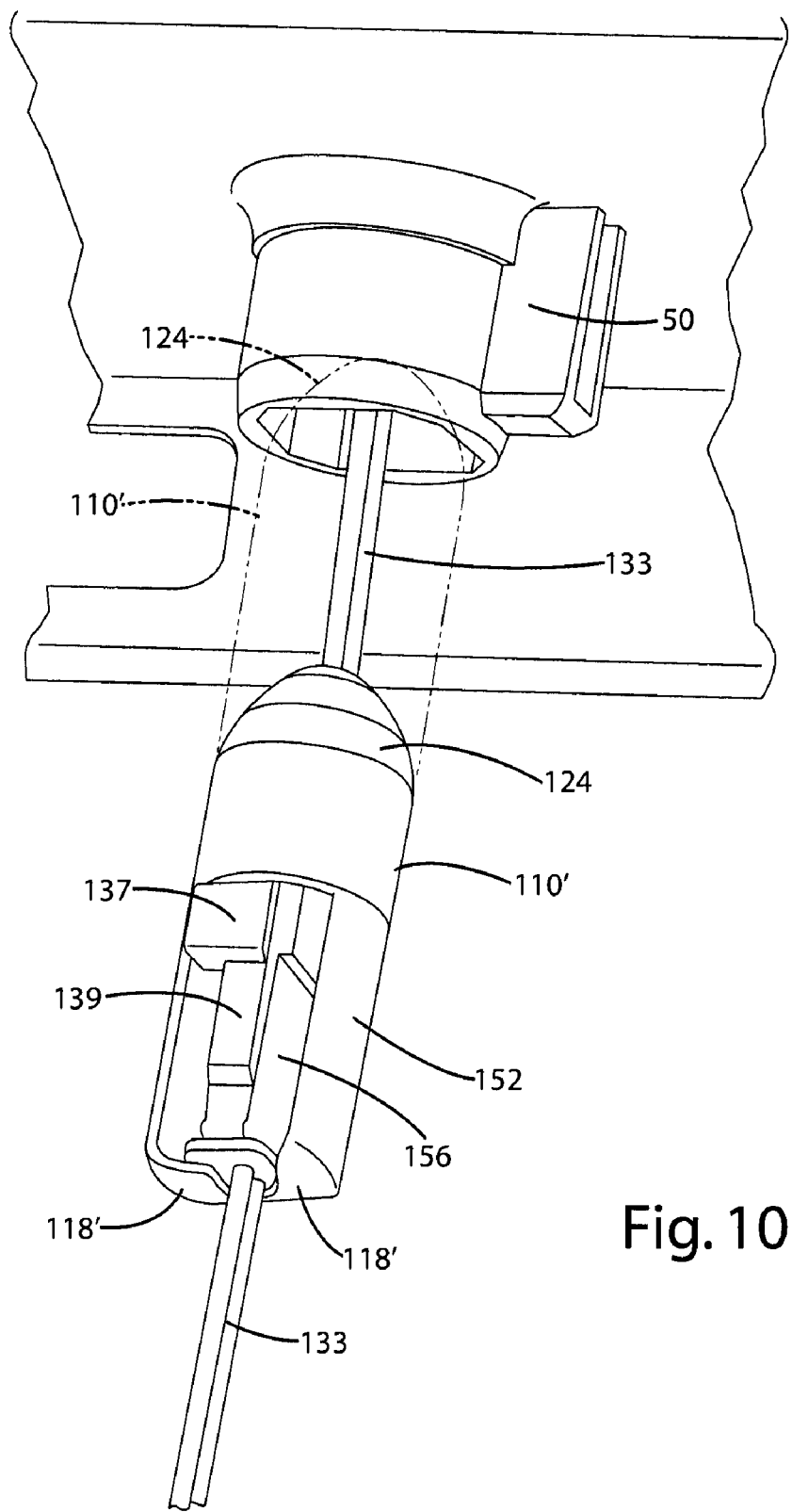
FIG. 10 is an enlarged perspective view of the connector in FIG. 9 with a connector being removed shown in phantom lines.

In an alternative embodiment, the connector sleeve 110' may be formed as illustrated in FIGS. 9-12. If the wiring harness 130, including wiring connectors 134 includes sharp edges or flat surfaces, such as surfaces that would be at least partially perpendicular to an end 54 surface of the guide sleeve 50, as illustrated in FIG. 8, removal of the wiring harness 130 from the seat back 30 may be difficult. More specifically, as illustrated in FIG. 8, the wiring harness 130 may engage the wiring connectors 134 to prevent removal from the seat back 30, or make removal difficult without potentially damaging the wiring harness 130. Any excessive force applied to the wiring harness may damage the wires 133, or where the wires are coupled to the connectors 134.

To improve removal of the wiring harness 130 after installation, a connector sleeve 110' as illustrated in FIGS. 9-12 may be coupled to the wiring harness 130. The connector sleeve 110' generally includes a removal surface 150, similar to the tapered portions 124 on the connector sleeve 110 that minimizes forceful engagement of the wiring harness 130 with the ends 54 of the guide sleeves 50 or other objects or materials within the seatback 30. The removal surface 150 is clearly illustrated in FIGS. 14-16 as a rounded or bulleted shape, such as an approximately spherical shape, frusto-conical shape or a combination thereof. Any removal surface 150 that minimizes engagement with the guide sleeve 50 and in particular the guide sleeve end 54 may be used.

The connector sleeve 110' further includes a main body portion 152. As illustrated in FIGS. 10-21, the main body portion 152 in the exemplary embodiment is generally an elongated cylindrical shape, however other shapes that minimize engagement of the connector sleeve 110' with the walls of the guide sleeve passageway 52 may be used. As further illustrated in FIGS. 9-11, the main body portion 152 may include access gaps 156 which allow, for easy removal of the connector sleeve 110' from the wiring connectors 134. For example, the connector sleeve 110' may include a snap engagement system and the access gaps 156 allows easy disengagement of the snap engagement system. This also allows easy disassembly of the wiring harness 130 during repair or replacement procedures. Of course, the connector sleeve 110' may be formed without access gaps 156.

As further illustrated in FIG. 16, the connector sleeve 110' may include tangs or ledges 118', which help to ensure that the wiring connectors 134 stay engaged with each other and within the connector sleeve 110'. The tangs or ledges 118' may include a variety of shapes and configurations and the minimize movement of the wiring connectors and associated wires 134 relative to the connector sleeve, and thereby wear of the wires. The removal surface 150 may also include tangs or ledges (not illustrated) to support or engage the wiring connectors 134. The ledges 118' ensure that when force is applied during removal of the headrest 80 and even during adjustment of the headrest 80, the connectors 137, 139 do not become electrically disconnected. More specifically, the ledges 118' provide support to the connectors 137, 139 as force is applied. The connector sleeve 110' may be designed so that it must be removed before the connectors 137, 139 can become electrically disengaged.

Although not illustrated in FIGS. 9-12, the bottom side, or the side opposing the removal surface 150 may also be shaped similar to the removal surface 150, or a variation thereof to improve insertion of the wiring harness connectors 134 and connector sleeve 110' into the seat back 30 through the guide sleeve passageway 52 during assembly. Although also not illustrated, the connector sleeve 110' may also be formed with the recess 126 on the main body portion 152 to engage the retention mechanism 60 during assembly. Of course, minor modifications may be needed to the support of the wiring connectors 134 within the connector sleeve 110'.

In the preferred method of assembly with the alternative connector sleeve 110', the seat and headrest 80 are also shipped to a point of assembly. At the point of assembly, the wiring connectors 134 are connected to create the wiring harness 130. With the wiring connectors 134 coupled, the connector sleeve 110' is then coupled around the wiring connectors 134 to ensure that the wiring connectors 134 stay connected during assembly and any later potential disassembly. The connector sleeve 110' is then released into the guide sleeve passageway 52 and the guide rods 90 on the headrest 80 are placed in guide sleeves 50, such that the connector sleeve 110' and wiring connectors 134 become disposed within the seat back 30. To aid in installation, the connector sleeve 110' may include tapered portions 124 on each end.

To ensure the wiring connector 130 coupled to the seat 20 remains accessible during shipping, a connector sleeve 110, similar to that in FIGS. 1-7 may be used and then discarded after the wiring connectors 134 are coupled and the subsequent connector sleeve 110' is engaged to the wiring connectors 134.

As illustrated in FIG. 13, portions of the connector sleeve 110 may be combined with connector sleeve 110' to form connector sleeve 110". More specifically, the recess 126 may be formed on the outer surface of the connector sleeve 110' to form connector sleeve 110". This connector sleeve 110" allows the second wiring harness 136 to be positioned and securely retained in the guide sleeve. When the headrest 80 is to be assembled to the seatback 30, the assembler grabs the connector sleeve 110', pulls up while releasing the retention mechanism 60 on the guide sleeves. The assembler then opens the connector sleeve 110", connects the wiring connectors 137, 139 and closes the connector to retain the coupled wiring connectors 137, 139. The assembler then inserts the connector sleeve into the passageway 52 on the guide sleeves and finishes installing the headrest.

The foregoing discussion discloses and describes an exemplary embodiment of the present invention. One skilled in the art will readily recognize from such discussion, and from the accompanying drawings that various changes, modifications and variations can be made therein without departing from the true spirit and fair scope of the invention.

The invention claimed is:

1. A connector sleeve having a longitudinal axis and configured to receive electrical connectors, said connector sleeve comprising:
   an outer surface including a first tapered portion and a circumferential channel;
   a passage extending along the longitudinal axis, said passage being defined by an inner wall and wherein said inner wall includes a first reduced diameter portion.

2. The connector sleeve of claim 1 wherein the reduced diameter portion forms a ledge extending outwardly and approximately perpendicularly toward the longitudinal axis.

3. The connector sleeve of claim 1 further including a second reduced diameter portion and wherein said passageway has a smaller diameter at said second reduced diameter portion than at said first reduced diameter portion.

4. The connector sleeve of claim 1 including an opposing second tapered portion.

5. A wiring harness assembly comprising:
   a first wiring harness including at least one wire terminating in a first electrical connector and wherein said electrical connector is configured to be electrically coupled to a second connector on a second wiring harness, said second wiring harness including at least one wire terminating in said second connector, said second connector including a wire end;
   a connector sleeve having a longitudinal axis coupled to said second wiring harness and wherein said connector sleeve defines a passageway including a ledge to support said wire end and wherein said connector sleeve includes an outer surface defining a recess and at least one tapered portion.

6. The wiring harness assembly of claim 5 wherein said recess is a circumferential groove.

7. The wiring harness assembly of claim 5 wherein said ledge is part of a first reduced diameter section and said passageway includes a second reduced diameter portion, said second reduced diameter portion configured to minimize movement of said wire along said longitudinal axis.

8. The wiring assembly of claim 5 wherein ledge is configured to support said second electrical connector and configured to prevent movement of said second electrical connector along the longitudinal axis of the connector sleeve as said first electrical connector is matingly engaged with said second electrical connector.

9. The wiring assembly of claim 5 wherein said tapered portion includes an upper ledge and an angled portion, said upper ledge having a surface substantially planar to the surface of said ledge and wherein said upper ledge extends between said passageway and said angled portion.

10. A wiring harness assembly for electrically connecting a vehicle seat with a headrest and wherein said seat includes a guide sleeve having a retention mechanism including a catch and wherein said guide sleeve is configured to receive a guide rod on the headrest, said wiring harness assembly comprising:
a first wiring harness extending from the headrest including at least one wire terminating in a first electrical connector and wherein said first electrical connector is configured to be electrically coupled to a second electrical connector on a second wiring harness extending from the seat;
a connector sleeve having a longitudinal axis coupled to said second wiring harness and wherein said connector sleeve defines a recess for receiving the catch from the retention mechanism and wherein said connector sleeve is partially disposed within the guide sleeve when the catch is disposed within said recess.

11. The wiring harness of claim 10 wherein the guide sleeve includes an upper surface and wherein said connector sleeve is proud of the upper surface when the catch is received within the recess.

12. The wiring harness of claim 10 wherein the connector sleeve includes two opposing ends and wherein said recess is near one opposing end.

13. The wiring harness of claim 12 wherein the one opposing end includes a tapered portion.

14. The wiring harness of claim 10 wherein said connector sleeve includes an inner wall defining a passageway for receiving said first and second electrical connectors.

15. The wiring harness of claim 14 wherein said inner wall includes a ledge directly engaging said second connector and wherein said ledge supports said second electrical connector against movement along the longitudinal axis as said first electrical connector is coupled to the second electrical connector.

16. The wiring harness of claim 10 including a tapered portion having a frustoconical shape and a passageway within said tapered portion.

17. The wiring harness of claim 10 having a longitudinal axis and wherein both said frustoconical shape and said passageway are approximately centered about said longitudinal axis.

18. A connector sleeve having a longitudinal axis, said connector sleeve comprising:
an outer surface including a tapered end;
a inner wall defining a cavity for receiving an electrical connector; and
a first leg extending toward said longitudinal axis and configured to retain the electrical connector within said cavity.

19. The connector sleeve of claim 18 further including an access slot defined by said outer surface.

20. The connector sleeve of claim 19 wherein said access slot extends from said tapered end to said leg.

21. The connector sleeve of claim 20 wherein said access slot extends across said tapered end.

22. The connector sleeve of claim 18 wherein said tapered end includes a wire exit hole.

23. The connector sleeve of claim 22 including an access slot defined by said outer wall extending from said wire exit hole to said leg.

24. The connector sleeve of claim 18 wherein said tapered portion is approximately domed shaped.

25. The connector sleeve of claim 18 wherein said tapered portion is frustoconical shaped.

26. The connector sleeve of claim 18 further including a recess defined by said outer surface, said recess extending at least partially circumferentially about said longitudinal axis.

27. The connector sleeve of claim 26 further including an access gap extending substantially perpendicular to said recess.

28. The connector sleeve of claim 18 further including a second leg extending toward said first leg and positioned approximately opposite said first leg about said longitudinal axis.

29. The connector sleeve of claim 28 wherein said legs define a wire exit therebetween.

30. A wiring harness assembly for a vehicle seat, said wiring harness assembly comprising:
a wiring harness including at least one wire terminating in a first electrical connector;
a connector sleeve having a longitudinal axis coupled to said wiring harness and wherein said connector sleeve includes an outer surface extending from a first end to a second end and wherein said outer surface includes a tapered portion near one of said ends and support legs near the other of said ends.

* * * * *